UNITED STATES PATENT OFFICE.

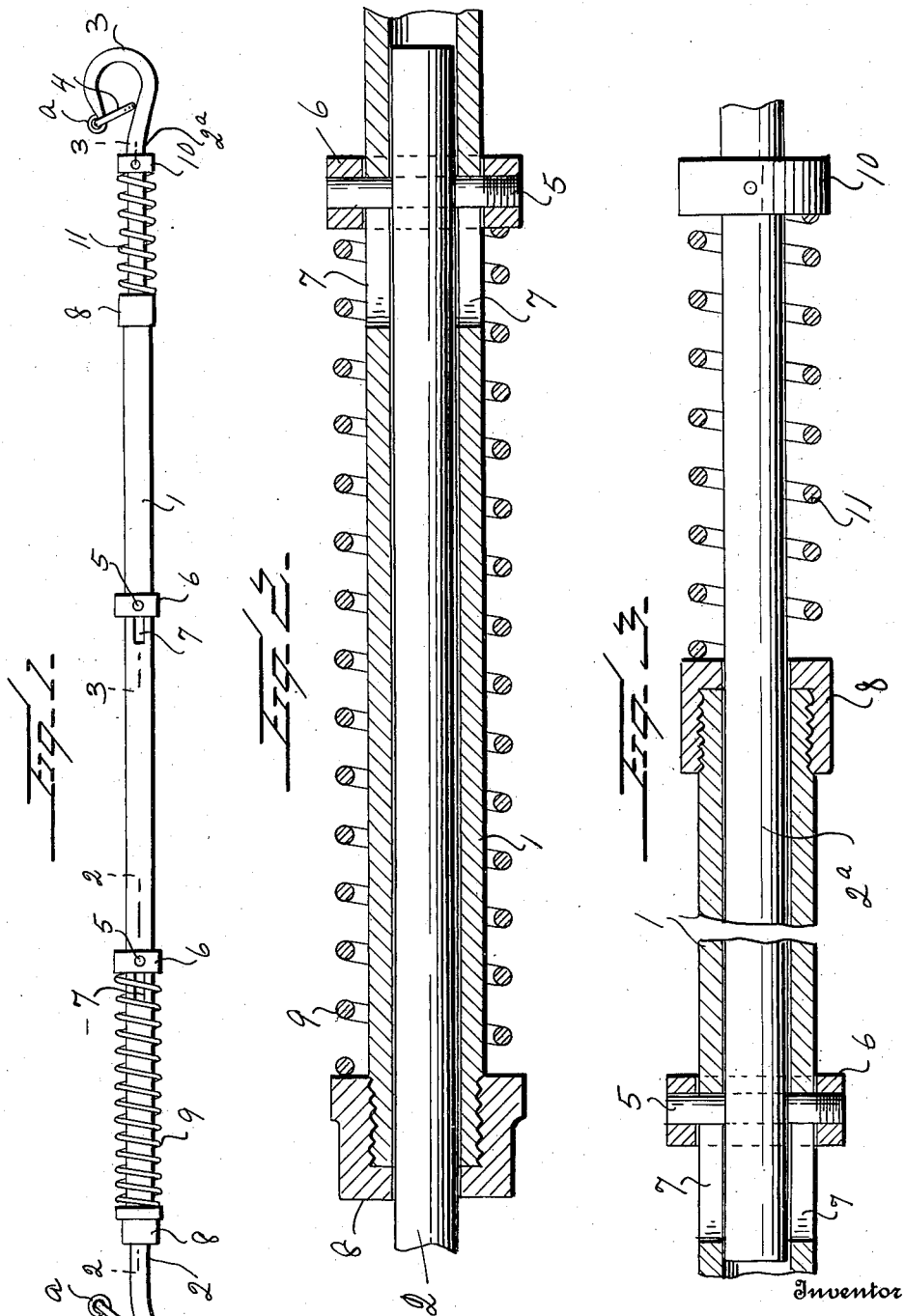

EZEKIEL W. McMINN, OF RICHMOND, VIRGINIA.

TOW-BAR.

1,375,056.　　　　Specification of Letters Patent.　　Patented Apr. 19, 1921.

Application filed July 6, 1920. Serial No. 394,042.

*To all whom it may concern:*

Be it known that I, EZEKIEL W. MCMINN, a citizen of the United States, residing at Richmond, in the county of Henrico and State of Virginia, have invented certain new and useful Improvements in Tow-Bars, of which the following is a specification, reference being had to the accompanying drawings.

This invention relates to certain improvements in tow bars and has relation more particularly to a device of this general character especially designed and adapted for use in connection with vehicles, such as automobiles, whereby one vehicle may be engaged with a second vehicle in a manner to couple the vehicles together to permit one vehicle to be towed by the other, and it is an object of the invention to provide a novel and improved device of this general character which may be readily and conveniently applied into working position and which is constructed in such a manner to compensate for the strains and stresses to which it may be subjected when in use.

The invention consists in the details of construction and in the combination and arrangement of the several parts of my improved tow bar whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a view in elevation of a tow bar constructed in accordance with an embodiment of my invention.

Fig. 2 is an enlarged fragmentary view partly in section and partly in elevation of the device as herein embodied, the section being taken substantially on the line 2—2 of Fig. 1, and Fig. 3 is an enlarged fragmentary view partly in section and partly in elevation of the device as herein embodied, the section being taken substantially on the line 3—3 of Fig. 1.

As disclosed in the accompanying drawings, my improved device comprises an elongated tubular member 1 preferably of metal and telescopically engaged within the opposite end portions of the member 1 are the elongated coupling shanks 2 and 2ª. The outer end portion of each of the shanks terminates in an inwardly facing hook member 3 and pivotally engaged with the free extremity of the bill *a* of each of the hook members is a locking ring 4 which permits a ready engagement of the hook member with its work but coacts with the adjacent shank in such a manner to prevent accidental displacement.

The inner end portion of each of the shanks 2 and 2ª has locked thereto by a pin 5 a collar or sleeve 6 surrounding the member 1 and movable longitudinally thereof. The extent of movement of the sleeve 6 and also of the shanks 2 and 2ª is limited by the diametrically opposed and longitudinally directed slot 7 produced in the wall of the member 1 and through which the pin 5 is disposed.

The opposite ends of the member 1 have threaded thereon the caps 8 and interposed between one of said caps 8 and a sleeve 6 is an expansible member 9, herein disclosed as a coil spring encircling the member 1 and which operates to normally maintain the adjacent shank 2 at the limit of its inward movement. The outer end portion of the shank 2ª at a point in close proximity to the hook member 3 carried thereby has fixed thereto a collar 10 and interposed between said collar 10 and the adjacent cap 8 is an expansible member 11, also preferably a coil spring encircling the shank 2ª and which serves to normally maintain said shank 2ª at the limit of its outward movement.

In practice, the hook member 3 carried by the shank 2ª is adapted to be engaged with a tow ring carried by an automobile or other vehicle or operatively engaged with any other suitable part of such vehicle while the hook member 3 carried by the shank 2ª is adapted to be engaged with the front axle of the automobile or other vehicle to be towed. The shanks 2 and 2ª have movement longitudinally of the member 1, one independently of the other, and the member or spring 9 coacting with the shank 2 serves to compensate for or absorb the shocks or jars incident to draft while the shank 2ª, together with the member or spring 11, operates to compensate for or absorb the shocks or jars incident to buff. This is of particular advantage in the event the pulling car should be brought to a relatively sudden stop or its speed decreased with respect to the vehicle being towed and also in the starting of the coupled vehicles.

As before stated, the slots 7 limit the endwise movement of the shanks 2 and 2ª and this has the further advantage of preventing derangement of the assembled bar or more particularly the springs 9 and 11 in the event of excessive strains or buffs and in either of which events the load will be carried directly by the member 1.

It is preferred that each of the pins 5 has an end portion in threaded engagement with the coacting sleeve 6 so that said pin is held against accidental displacement.

From the foregoing description it is thought to be obvious that a tow bar constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

A device of the character described comprising a tubular member, coupling means carried by one end of said member, a coupling shank telescopically engaged in the opposite end portion of the tubular member, said tubular member having registering slots adjacent the inner end of the shank, a sleeve slidable on the tubular member, said shank being connected to the sleeve through the slots, a cap on said end of the tubular member, and a spring surrounding the tubular member and engaging the sleeve and the cap.

In testimony whereof I hereunto affix my signature.

EZEKIEL W. McMINN.